J. BROCKWAY.
MACHINE FOR MAKING SILVER SPOONS.
Patented Sept. 20, 1836.
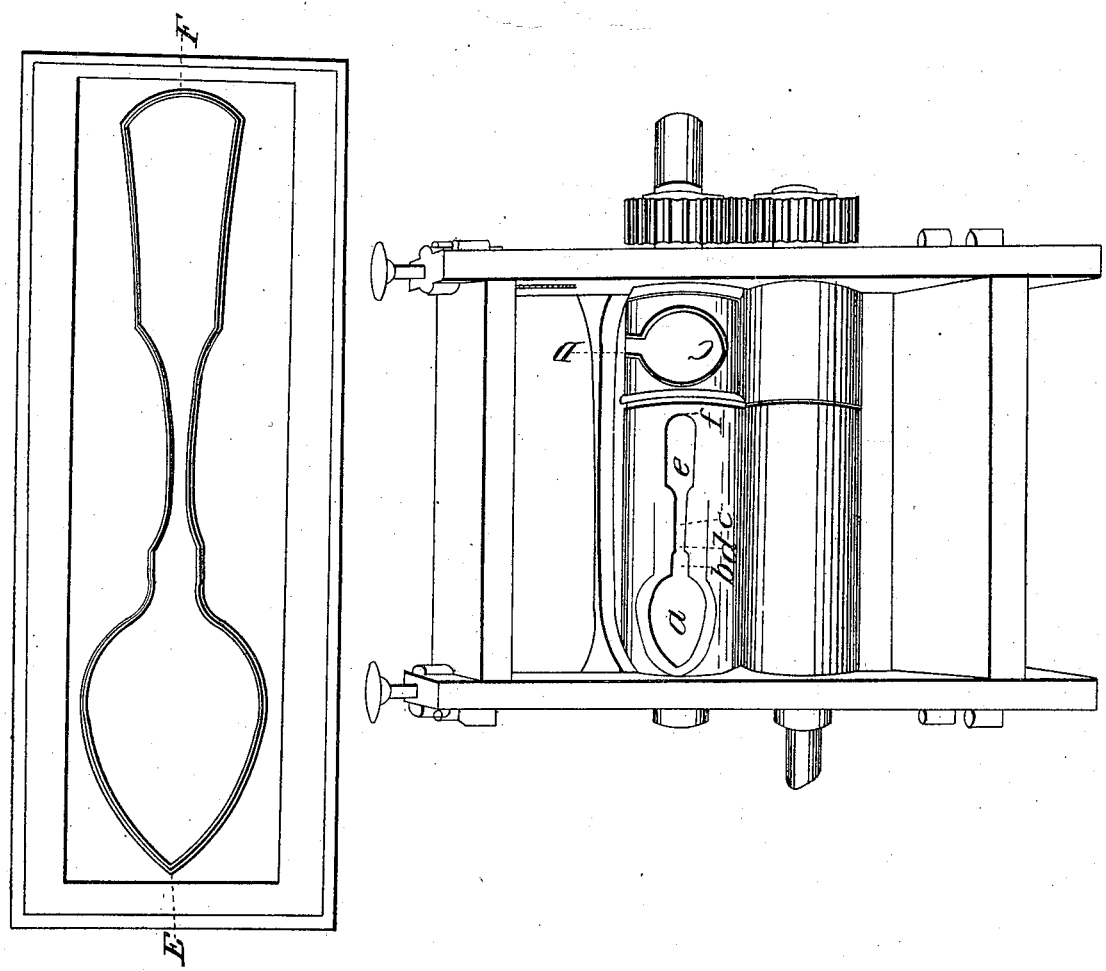

UNITED STATES PATENT OFFICE.

JOSEPHUS BROCKWAY, OF TROY, NEW YORK.

MACHINE FOR MANUFACTURING SILVER SPOONS.

Specification of Letters Patent No. 26, dated September 20, 1836.

*To all whom it may concern:*

Be it known that I, JOSEPHUS BROCKWAY, of the city of Troy, county of Rensselaer, and State of New York, have invented a new and useful Improvement in the Making or Manufacturing of Silver Spoons, which invention and the manner of using it is as follows.

This improvement in the manufacture of spoons consists in plating and cutting a bar of silver in the shape, thickness and just proportions of a spoon by means of a mill in all its outlines precisely like a common plater's mill. A common plater's mill with eight inch rolls may be converted to this purpose, and as these are in common use, and well known, further description is deemed unnecessary. The drawing exhibits its appearance. The first operation of this mill is to take a bar of silver, about half an inch shorter than the spoon required. This must be rolled through widthwise, the bar of silver should be very little thicker than the thickest part of the spoonhandle required, and as wide as the handle at the shoulder. One end of this bar will then be placed directly over the center of the rise, or peen marked *a,* upon the upper roller, and the mill turned, and it will come through plated, and widened at one end in the shape of a spoon bowl, and at the other widened like the flat part of a spoon handle. The spoon bar is to be rolled through, and through, the screws put down at every turn until the bowl is sufficiently enlarged, and the handle brought to the proper thickness, or proportion of thickness. The handle in its entire length is left by this process, a little thicker than is required to be reduced by the cutter, as will hereinafter be described.

*Description of the peening roller.*—That part of the roller marked *a,* on the drawing is called the peen, and in form resembles a spoon bowl, it is left highest at the point *a,* which is designed to form the center of the spoon bowl. From the point *a,* this peen slopes in every direction in a manner corresponding to the desired thickness of the silver in the bowl of a spoon, that is it is so shaped that in rolling the silver through, the part of the bar, in contact with this peen, is pressed most at the center *a,* and least at the point, when the bowl of the spoon is required to be thickest. This peen, or spoon bowl is formed by grinding, or filing the rollers as follows. The roller is cut away at the heel of the bowl where the shoulder of the handle is to be formed, just equal to the thickness of the spoon bar, so that in passing it through it is not pressed at all at that point, then the peen or bowl is formed upon the roller by cutting down the roller all around the peen taking away most where the silver in a spoon bowl is required to be thickest, so that as a bar of silver passes through, it shall spread the silver to the shape, and thickness desired for a spoon bowl of any description. To form the narrow part of the handle marked B, C, so much is cut away from the roller that the bar of silver is not pressed at all in passing in part of it. From the point *a,* to *e,* there is a gradual slope, so that when the rollers are brought to their nearest contact with each other, and the spoon rolled through there is a gradual diminuation in the thickness of the silver from *a,* to *e.* At *e,* the roller is left plain, nothing being cut away at *f,* or at the end of the handle, the roller is a little sunk again to leave increased thickness at the end of the handle, or in a word at all these points above referred to the roller is cut away sufficient to press the silver in the proportions required.

A bar of silver passes through the part of the mill prepared as above described from six to twelve times. The screws being put down at every turn comes out at last with a bowl nearly in perfect shape, and with the silver laid precisely where it is wanted. The handle has its just proportion as to thickness, but is not now in its proper form; to obtain this, and at the same time increase its length, and give elasticity, and preserve and perfect its proportion, it must now be rolled through the cutter C, D, entering at the point of the bowl. The cutter is the exact form, and proportion of a spoon in all its parts, at every point it has the width, and depth of the spoon required, so that while it cuts the spoon to its proper shape, it at the same time gives to it its true proportion of thickness, and leaves the handle hard, and elastic, while the bowl, which is not to be pressed much if at all is left soft, and ready to be raised. The cutting edges of this cutter are formed as will be seen by the drawing by removing the steel all around the cutter. A sufficient portion of the roller, must be removed to receive the chips, or pieces of silver to be cut off while at each side of this excavation around the cutter r, the roller is left perfect so that both rolls shall come in contact with each other on each side of the cutter in order to prevent the cutting edges from being injured. Both the drawing and the model presents the cutter, and the peening, or plating process upon one, and the same pair of rollers, but in practice it is preferable that two different and separate mills be employed. One roller may be prepared and fitted for several different sized spoons. Teas and tables, salts and creams, may be all put upon one roller if its size and length be sufficient, in this case one mill will plate a variety of spoons, while another mill may be used for cutting, this may have a short pair of rollers, and have but one spoon upon each, or a longer roller, and several different sizes upon one and the same roller, but the short roller with but one cutter upon it will be preferable.

With these mills in connection with a plain and common plater mill the whole labor of giving form to silver spoons is contemplated. The silver will pass directly from the ingot to the common rolling mill and be rolled to the size required for the peening or plating mill described above, from that it goes to the cutting mill, and is there turned out in perfect form. These mills may each and severally be turned by hand, water, or steam-power. By steam or water power a spoon a minute may be produced in a form suitable for raising and finishing. The drawing E, F, represents a cutter designed to pass through two plain rollers. This cutter is in all respects like the one cut into the roll with this exception, it is designed to pass between two rolls instead of being cut into a roller, but the cutter on the roller will be found best in practice though more expensive.

Now what I claim as new in principle, and practice, and as my invention is—

1. The shaping of a roller of a common plater's mill, so that it shall receive a bar of silver widthwise, and roll it into the shape of a spoon, one end for the bowl, and the other for the handle, leaving the bowl in its proper shape with the silver thickest at the edges and thinnest in the middle, and this to be made separate from though designed for a cutter.

2. The formation of a cutter in the same, or a separate mill, or on a separate piece of steel designed only to cut off the edges, without altering at all the thickness of the silver in the bowl, but to extend the length of the handle, perfect its proportionate thickness, and cut it to its proper shape. It is then made separately, but combined in their use, as above described, and not anything designed to perform both operations at once, for which I ask Letters Patent.

I witness whereof I have hereunto subscribed my name this seventh day of September, in the year of our Lord one thousand eight hundred and thirty-six.

JOSEPHUS BROCKWAY.

Witnesses:
GEORGE DAVIS,
DOW VAN NEGHTEN.